United States Patent
Eckstein et al.

(12)

(10) Patent No.: US 6,288,468 B1
(45) Date of Patent: Sep. 11, 2001

(54) DIRECT CURRENT MOTOR COMMUTATION DEVICE

(75) Inventors: Dietrich Eckstein, Kappelrodeck; Hans Bertsch, Lichtenau, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/242,071

(22) PCT Filed: Jun. 20, 1997

(86) PCT No.: PCT/DE97/01270

§ 371 Date: Nov. 30, 1999

§ 102(e) Date: Nov. 30, 1999

(87) PCT Pub. No.: WO98/06163

PCT Pub. Date: Feb. 12, 1998

(30) Foreign Application Priority Data

Aug. 7, 1996 (DE) ............................................. 196 31 828

(51) Int. Cl.[7] .................................................... H02K 13/10
(52) U.S. Cl. ........................ 310/219; 310/233; 310/248
(58) Field of Search .................................. 310/233, 240, 310/242, 239, 245, 220–222, 51, 42; 29/596–598; 318/280, 266, 282, 246, 139, 269

(56) References Cited

U.S. PATENT DOCUMENTS

| 1,861,059 | * | 5/1932 | Johson | 310/212 |
| 4,633,153 | * | 12/1986 | Thornton et al. | 318/280 |
| 5,049,772 | | 9/1991 | Mottier et al. . | |
| 5,910,696 | * | 6/1999 | Kang | 310/236 |

FOREIGN PATENT DOCUMENTS

| 417833 | 8/1925 | (DE) . |
| 581 451 | 7/1933 | (DE) . |
| 42 29 045 A1 | 3/1994 | (DE) . |
| 43 29 753 A1 | 3/1995 | (DE) . |
| 44 22 083 A1 | 1/1996 | (DE) . |
| 44 38 868 A1 | 5/1996 | (DE) . |
| 2 257 162 | 8/1975 | (FR) . |
| 2 515 439 | 4/1983 | (FR) . |
| 2 256 753 A | 12/1992 | (GB) . |

* cited by examiner

*Primary Examiner*—Tran Nguyen
(74) *Attorney, Agent, or Firm*—Venable; Norman N. Kunitz

(57) ABSTRACT

Proposed is a commutation device for a direct-current motor, designed to improve the ripples in the signal course (40, 50) for the commutation current, so as to obtain reliably and error-free speed information with the aid of an electronic circuit. With the commutation device design according to the invention, the longitudinal edges of the collector bars (11, 21, 31) form an angle (α) of more than zero degrees with the front longitudinal edge (18, 28, 38) of the contact face (16, 26, 36). On the one hand, this results in a reduction of the brush noise (airborne sound) and, on the other hand, in a lowering of the noise development (structure-born sound).

14 Claims, 2 Drawing Sheets

DIRECT CURRENT MOTOR COMMUTATION DEVICE

BACKGROUND OF THE INVENTION

The invention originates with a commutation device for a direct-current motor, comprising among other things collector bars and brushes according to the preamble to the main claim, for which the current ripple can be detected with the aid of an electronic circuit and can be evaluated as measure for the speed or the number of motor rotations. The detection, evaluation and use of the alternating component of the current ("ripple") for direct-current motors as measure for the motor speed is generally known. One method used in this connection is the so-called ripple-count method. With this method, the analog signal of the commutation current proceeds in addition to the higher-frequency ripple with a low-frequent modulation due to production tolerances, caused by differences in the coil sections of the motor armature. In the process, local minima and maxima occur, for which the minima can have absolute higher values than the maxima. For that reason, a local detection by means of an involved, differentiating method is necessary.

The problem of evaluating the analog signal of the commutation current at low cost and with low expenditure for the circuit technology is partially solved with the aid of a known method and arrangement in the DE-A-44 22 083 (German Published Examined Application).

However, a slight geometric displacement of the jointly operating brushes in particular will lead to additional current ripples in the signal course of the commutation current and thus to undesirable false signals since the shape of the brush running surface considerably influences the analog signal of the commutation current.

A known device for improving the analog signal of the commutation current (reference DE-A-31 48 966) represents one such attempt to solve this problem and avoid false signals. In this reference, it is explained that the improved analog signal is the result of a change in the shape of the brush running surface, which has two essentially point-shaped or line-shaped contact faces to the commutator, thus leading to a better coverage with respect to time and geometry, as well as a longer commutation time.

One disadvantage of these arrangements is the loud brush noise caused by the collector bars being run abruptly under the brush. The brush noise is defined, in a manner known per se, as the airborne sound generated in the process, which can be measured with a microphone. With the modified shape of the brush running surface according to the DE-A-44 38 868, the collector bars in each case are run twice per brush under the brush running surface, thereby causing and even stronger noise development.

SUMMARY AND ADVANTAGES OF THE INVENTION

Designing the commutation device according to the invention, represent a better approach to the solution.

The above object generally is achieved according to the present invention by a communication device for a direct current motor, in particular for a mechanically commutated direct current motor, comprising: a commutator with collector bars and brushes, wherein the brushes respectively share a contact face with the commutator, and wherein the ripples in the current, which develop during the commutation of the motor current, are detected with the aid of an electronic circuit and the ripple frequency is evaluated as a measure for the speed and in roder to obtain unambiguous and error-free speed information, the logitudinal edge of the collector bars and the front longitudinal edge of the contact face respectively one of the brushes together enclose an angle ($\alpha$) that exceeds zero degrees, so that at least two neighboring collector bars are constantly short-circuited via the brush.

The invention makes it possible to obtain unambiguous and error-free speed information from ripples in the commutation current for the mechanically commutated direct-current motor, which can be used for the speed, angle and path detection. Traditionally designed brush running surfaces with a contact face toward the commutator are preferably used for this.

It must be viewed as essential advantage of the commutation device design according to the invention, as defined in the main claim, that the commutation operation requires more time since respectively two neighboring collector bars are short-circuited as a result of the brush surface making contact with the commutator over a larger range of the rotational angle for the direct current motor armature.

Thus, given a geometric displacement of the brushes, it is possible to avoid the occurrence of additional current ripples in the course of the commutation current signal. These ripples are erroneously detected and counted as separate pulses by the evaluation electronics.

Furthermore, the noise development of the motor is reduced owing to the longer commutation time because the momentary ripple within one armature rotation is smaller and the electromagnetic excitation of the motor housing is lower. This noise development corresponds to the so-called structure-born noise, which is measured in the form of vibrations.

An additional advantage of this solution lies in the clearly reduced brush noise. Owing to the design of the commutation device according to the invention, the collector bars no longer run abruptly (at one point in time) under the brush, but enter gradually or continuously.

Given a brush running surface design according to the reference DE-A-31 48 966, for example, for which the brush has two contact faces to the commutator and each collector bar is therefore run twice per brush under a contact face, the brush noise can be improved noticeably and the noise pollution reduced if the commutation device is designed according to the invention.

The measures listed in the dependent claims result in advantageous modifications and improvements of the features listed in the main claim. The option of using standard, commercially available brushes is particularly advantageous, since the brushes are subject to wear and thus must be exchanged more frequently. This results in a reduction in costs.

Exemplary embodiments of the invention are shown in the drawing and are explained in further detail in the following description, below:

DETAILED DESCRIPTION OF THE EXEMPLARY EMBODIMENT

Figure 1:
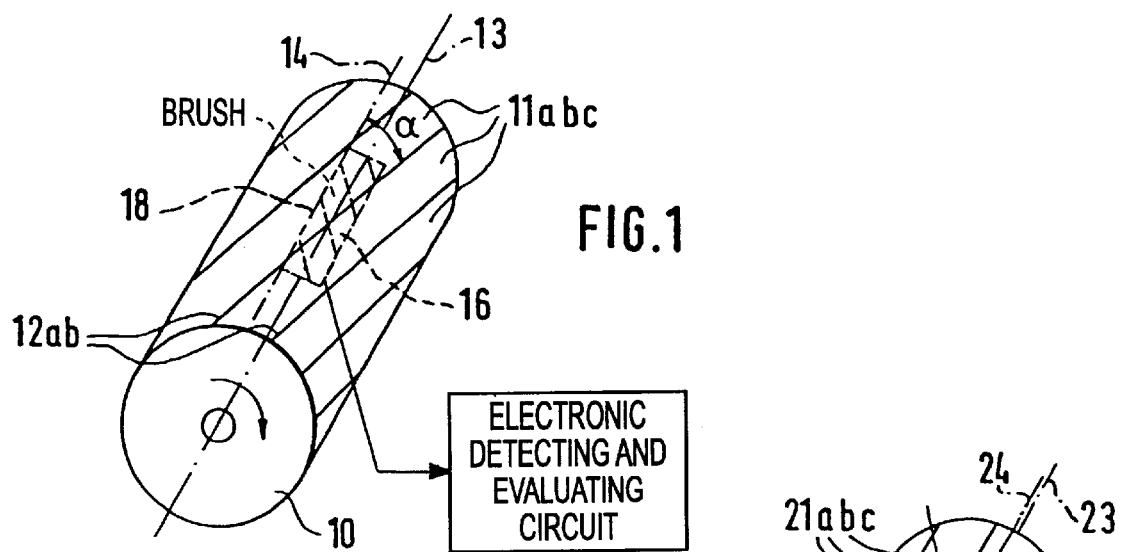
FIG. 1 Schematically shows the commutation device for a direct-current motor exemplary design of the collector bars and the brush; according to a first embodiment of the invention.

FIG. 1 shows a schematic, three-dimensional image of a commutator 10 for a direct-current motor, constructed from collector bars 11 that are arranged side-by-side along the circumference and have insulating segments 12 in-between. The commutator 10 rotates in arrow direction around an axis 13. An imaginary straight line 14 runs parallel to this axis 13 in the cylindrical surface of commutator 10. This imaginary, axis-parallel straight line 14 overlaps with a front longitudinal edge 18 of a contact face 16 between brush and commutator 10. The longitudinal edge 18 encloses an angle $\alpha$ of, for example, ten degrees with each of the longitudinal edges of the collector bars 11. The contact face 16 of the brush is drawn in schematically on the surface of commutator 10 and operates jointly with a corresponding, opposite-arranged second brush, which is not visible here. The commutator 10 is positioned rotation-symmetrical to the axis 13.

During the direct-current motor operation, the commutator 10 rotates underneath the contact face 16. The collector bar 11b is short-circuited via the contact face 16 with the neighboring collector bar 11c. Following the commutation time, the commutator 10 has turned far enough underneath the contact face 16, so that the collector bar 11b is no longer short-circuited with the adjacent collector bar 11c, but is short-circuited with the following collector bar 11a.

Figure 2:
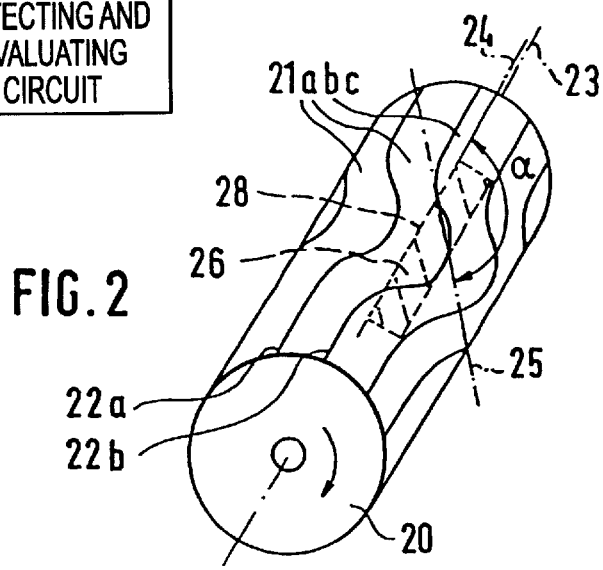
FIG. 2 Schematically shows the commutation device for a direct-current motor with another exemplary embodiment of the collector bars.

FIG. 2 schematically shows a three-dimensional view of a commutator 20, consisting of the collector bars 21a, b, c . . . , which have in the center region a curvature in a circumferential direction and are insulated against each other through insulating segments 22a, b, . . . The commutator 20 rotates in arrow direction around its axis 23. An imaginary, optional, axis-parallel straight line 24 runs through the commutator surface, which in turn overlaps with the front longitudinal edge 28 of a contact face 26. Together with a tangent 25 against the curvature of collector bar 21, meaning at the point of intersection of the front longitudinal edge 28 with the longitudinal edge of the collector bar 21, this longitudinal edge 28 encloses the angle $\alpha$ of approximately one hundred twenty degrees. The collector bars 21 can also have a $\Omega$-shaped curvature in the commutator surface in circumferential direction. In that case, the angle $\alpha$ a can vary between zero and one hundred eighty degrees.

Figure 3:
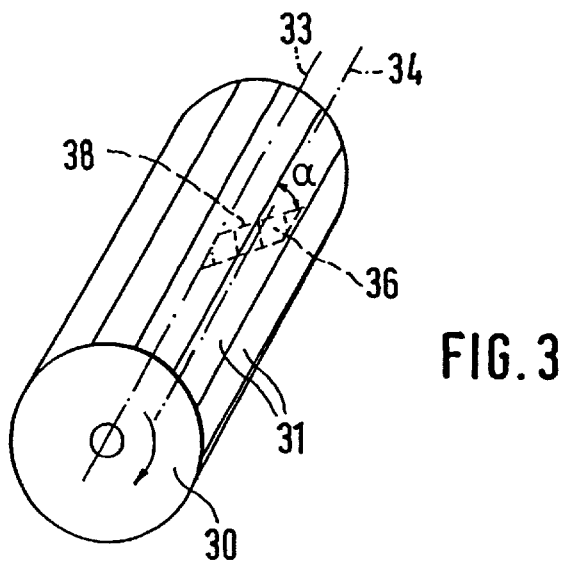
FIG. 3 Schematically shows the commutation device for a direct-current motor with a third exemplary embodiment of the collector bars and the brushes according to the invention.

The diagram in FIG. 3 shows a three-dimensional view of a commutator 30, constructed from axis-parallel collector bars 31. The commutator 30 rotates in arrow direction around an axis 33, underneath a contact face 36 of a brush. The front longitudinal edge 38 of this brush is positioned at the angle $\alpha$ of 10 degrees to the collector bar 32, the longitudinal edge of which overlaps with the axis-parallel straight line 34.

The angle $\alpha$, the width of the collector bars 11, 21, 31 and the shape of the contact face 16, 26, 36 in each exemplary embodiment must be coordinated with each other in such a way that at least two collector bars 11, 21, 31 are short-circuited continuously.

Figure 4:
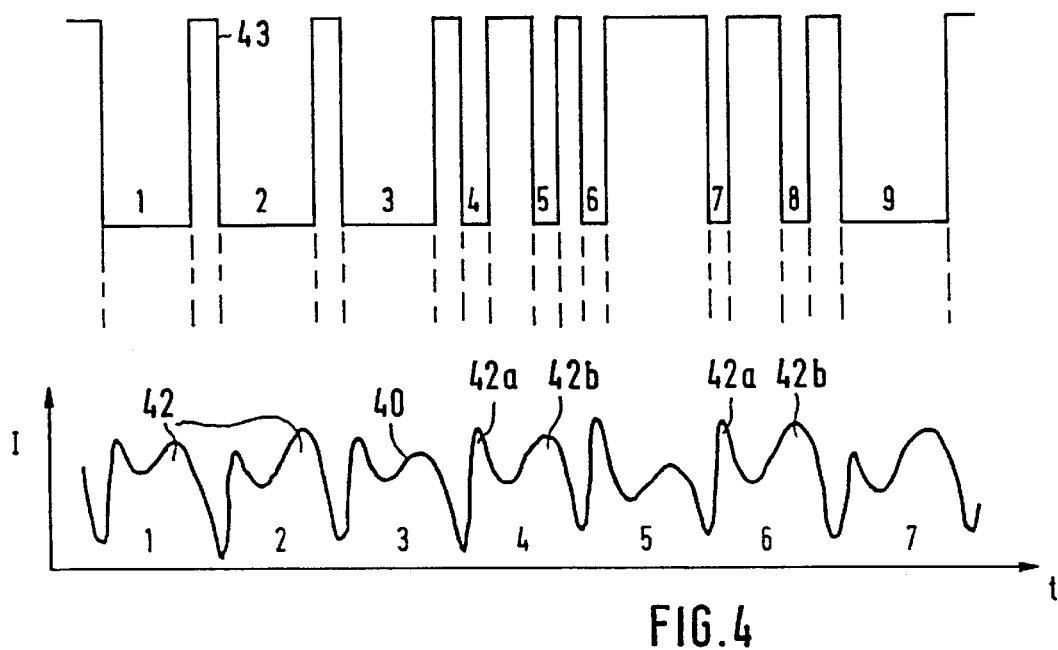
FIG. 4 Shows a diagram for analog signals of the commutation current with current ripples and digital signals, obtained therefrom, on a known commutation device.

The lower curve in FIG. 4 shows the analog signal for the commutation current 40 of a direct-current motor with traditional commutation device (collector bars and front longitudinal edge of the brush contact faces are axis-parallel), plotted on the time axis t. Seven pulses 42 can be seen in the progression of current 40, wherein each pulse 42 shows two ripples 42a and b. In the upper part of the diagram, the digital signal course 43 is shown, which is obtained from the analog signal for the commutation current with the aid of an electronic evaluation device that is known per se. As can be seen here, the electronic evaluation device has erroneously detected nine pulses instead of the required seven.

Figure 5:
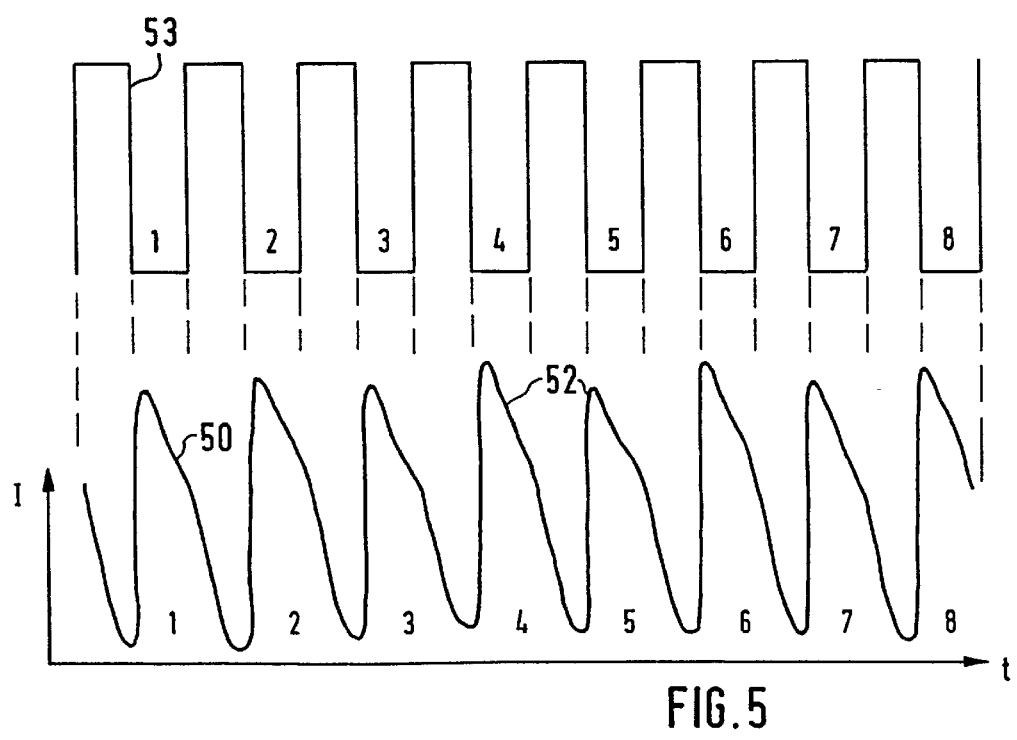
FIG. 5 Shows a diagram, similar to the one in FIG. 4, but generated with the aid of the commutation device designed according to the invention as shown in FIG. 1.

FIG. 5 shows the analog signal for commutation current 50 and the digital signal 53, obtained therefrom, for a mechanically commutated direct-current motor by using the commutation device design according to the invention, which is based on the first exemplary embodiment according to FIG. 1. The lower curve corresponds to the analog signal course of the commutation current 50 over a time range that corresponds to eight pulses 52. The ripples can no longer be seen in this signal course. The electronic evaluation device can detect the analog pulses 52 with corresponding reliability and can convert these to eight digital pulses.

It must be noted here that the brushes can be designed such that in place of an essentially triangular or line-shaped contact face 16, 26, 36, they can have two essentially circular or point-shaped contact faces. In that case, the front longitudinal edge 18, 28, 38 of the contact face that is critical for angle $\alpha$ corresponds to the front edge of a connecting area that connects the two essentially circular or point-shaped contact faces.

Alternative designs of the longitudinal edges of the collector bars 11, 21 or the contact face 36 include angular or bent shapes, in particular circular segments or curved shapes.

The commutators 10, 20, which are provided with the collector bars 11, 21 as shown in FIGS. 1 and 2, could also be operated, for example, with the brushes designed according to the reference DE-A-31 48 966.

The aforementioned exemplary embodiments have in common that with a suitable dimensioning of the collector bars 11, 21, 31, the contact face 16, 26, 36 and the angle $\alpha$, it is possible to achieve the same commutation times and the advantages derived thereof.

What is claimed is:

1. A commutation device for a direct current motor, in particular for a mechanically commutated direct current motor, comprising a commutator with collector bars and brushes, wherein the brushes respectively share a contact face with the commutator; and wherein current ripples developed during the commutation of the motor current, are detected with an electronic circuit and a frequency of said current ripples is evaluated as a measure for the speed; and, in order to obtain unambiguous and error-free speed information, a longitudinal edge of the collector bars and a front longitudinal edge of the contact face of respectively one of the brushes together enclose an angle ($\alpha$) that exceeds zero degrees, so that at least two neighboring collector bars are always short-circuited via the brush.

2. The commutation device according to claim 1, wherein at least one of the longitudinal edges of the collector bars and the front longitudinal edge of the contact face form an angle with an imaginary, axis-parallel straight line in the commutator surface, and at least two collector bars are always short-circuited by the contact face.

3. The commutation device according to claim 2, wherein the front longitudinal edge of the contact face is positioned parallel to the imaginary axis-parallel straight line in the commutator surface, and the longitudinal edges of the collector bars are positioned at a constant angle ($\alpha$) of more than zero degrees and less than forty-five degrees to the imaginary, axis-parallel straight line.

4. The commutation device according to claim 2, wherein the front longitudinal edge of the contact face is positioned parallel to the imaginary, axis-parallel straight line and the longitudinal edges of the collector bars are curved in some sections of the commutator surface in a circumferential direction; and, the amount for angle ($\alpha$) in the region of the curvature, that is to say between the tangent on the collector bars and the longitudinal edge of the contact face, is higher than zero and less than one hundred eighty degrees.

5. The commutation device according to claim 2, wherein the longitudinal edges of the collector bars are positioned parallel to an imaginary, axis-parallel straight line, and the front longitudinal edge of the contact face of respectively one of the brushes is at a constant angle ($\alpha$) to the commutator of more than zero degrees and less than forty-five degrees to the imaginary, axis-parallel straight line.

6. The commutation device according to claim 5 wherein the constant angle ($\alpha$) is equal to ten degrees.

7. The commutation device according to claim 3 where in the constant angle ($\alpha$) is equal to ten degrees.

8. The commutation device for a mechanically commutated direct current motor, comprising: a commutator with collector bars, and brushes, with the brushes respectively having a contact face in contact with a face of the collector bars; and with a longitudinal edge of the collector bars and a front longitudinal edge of the contact face of a respective one of the brushes together enclosing an angle ($\alpha$) that exceeds zero degrees so that at least two neighboring collector bars are always short-circuited via the brush; and an electronic circuit connected to the brushes for detecting current ripples developed, during the commutation of the motor current, and for evaluating a frequency of said current ripples as a measure of the speed to obtain unambiguous and error-free speed information.

9. The commutation device according to claim 8, wherein at least one of the longitudinal edges of the collector bars and the front longitudinal edge of the contact face form an angle to an imaginary, axis-parallel straight line in the commutator surface, and at least two collector bars are always short-circuited by the contact face.

10. The commutation device according to claim 9, wherein the front longitudinal edge of the contact face is positioned parallel to the imaginary axis-parallel straight line in the commutator surface, and the longitudinal edges of the collector bars are positioned at a constant angle ($\alpha$) of more than zero degrees and less than forty-five degrees to the imaginary, axis-parallel straight line.

11. The commutation device according to claim 10 wherein the constant angle ($\alpha$) is equal to ten degrees.

12. The commutation device according to claim 9, wherein the front longitudinal edge of the contact face is positioned parallel to the imaginary, axis-parallel straight line and the longitudinal edges of the collector bars are curved in some sections of the commutator surface in a circumferential direction; and, the angle ($\alpha$) in the region of the curvature between a tangent on the collector bars and the longitudinal edge of the contact face is larger than zero and less than one hundred eighty degrees.

13. The commutation device according to claim 9, wherein the longitudinal edges of the collector bars are positioned parallel to an imaginary, axis-parallel straight line, and the front longitudinal edge of the contact face of respective ones of the brushes is at a constant angle ($\alpha$) to the commutator of more than zero degrees and less than forty-five degrees to the imaginary, axis-parallel straight line.

14. The commutation device according to claim 13 wherein the constant angle ($\alpha$) is equal to ten degrees.

* * * * *